(No Model.)

B. P. LUCE.
WICK RAISING MECHANISM FOR LAMPS.

No. 444,598. Patented Jan. 13, 1891.

Witnesses:—
D. H. Hayward
Fred Haynes

Inventor:—
Bartlett P. Luce
by attorneys
Brown & Seward

THE NORRIS PETERS CO., PHOTO-LITHO., WASHINGTON, D. C.

UNITED STATES PATENT OFFICE.

BARTLETT P. LUCE, OF BOSTON, MASSACHUSETTS, ASSIGNOR TO THE BRISTOL BRASS AND CLOCK COMPANY, OF FORESTVILLE, CONNECTICUT.

WICK-RAISING MECHANISM FOR LAMPS.

SPECIFICATION forming part of Letters Patent No. 444,598, dated January 13, 1891.

Application filed September 30, 1890. Serial No. 366,628. (No model.)

*To all whom it may concern:*

Be it known that I, BARTLETT P. LUCE, of the city of Boston, in the county of Suffolk and State of Massachusetts, have invented a new and useful Improvement in Wick-Raising Mechanism for Lamps, of which the following is a specification.

My invention relates to an improvement in wick-raising mechanism for lamps in which wick-grasping mechanism is automatically forced toward and away from the wick by suitable guides fixed in position to engage the grasping mechanism as it is moved up and down within the lamp-bowl.

A practical embodiment of my invention is represented in the accompanying drawings, in which—

Figure 1:
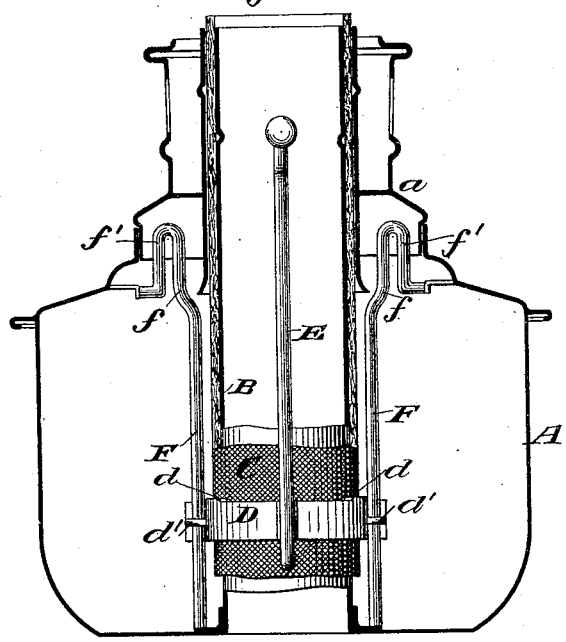
Figure 2:
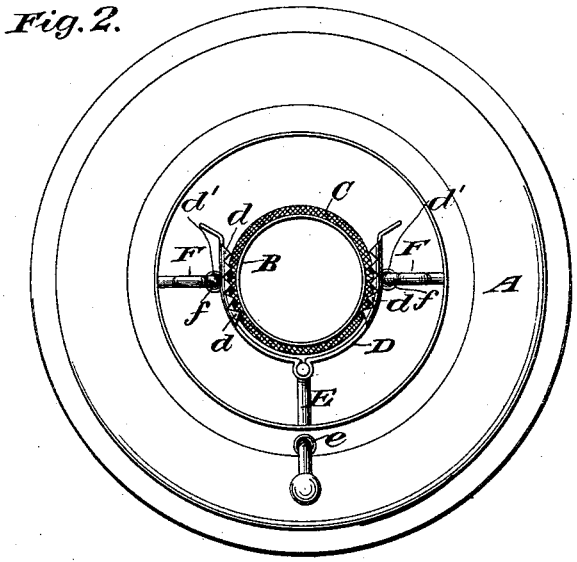
Figure 3:
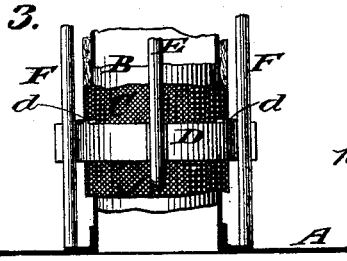

Figure 1 represents a vertical central section of a lamp-bowl with the wick-raising mechanism in position therein. Fig. 2 is a top plan view, the top of the lamp-bowl being removed to show the wick-raising mechanism; and Fig. 3 is a partial vertical central section showing a modified form.

A represents a lamp-bowl of any desired form and size and provided with a cap $a$, adapted to fit over a central opening in the top of the bowl. The lamp-bowl here shown is constructed to admit of a central draft, and is provided with a tube B, extending upwardly from its bottom, about which the wick C is intended to be adjusted.

The device for grasping the wick consists of a pair of jaws D, provided upon their inner edges with teeth $d$, and adapted to engage, as near as may be, the diametrically-opposite sides of the wick. In the structure herein shown the said jaws are elevated and lowered by means of an operating-rod E, attached at its lower end to the jaws and extending thence upwardly through an opening $e$ in the top of the lamp-bowl.

One or more fixed guides F—in the present instance two—are secured to the lamp-bowl, so as to extend along the side of the tube B, and spaced therefrom a sufficient distance to admit of the travel of the wick and the grasping device between them and the tube. In the form which I have presented the guides F consist of small rods fixed at their lower ends to the bottom of the bowl and at their upper ends to the top of the bowl. Near their upper ends they recede from the tube, as shown at $f$, and thence extend upwardly, outwardly, and downwardly in loop form, as shown at $f'$. It is intended that the guides F shall be caused to recede at the points $f$ sufficiently to release the grasping-teeth $d$ from the wick and allow the wick to be drawn off from or adjusted upon the tube B. The jaws D are either formed of spring metal and so constructed that the spring-tension will tend to force them at all times away from the tube into contact with the guide, or when they are provided with clips $d'$, as shown in Fig. 1, which secure them to the guide and cause them to follow its direction, they might be hinged together in any well-known or approved manner, so as to freely open and close as they are slid up and down along the tube.

In the structure shown in Fig. 3, where the jaws are not connected with the guides, it is intended that they shall be of spring metal and have a tendency to separate so as to follow the direction of the guide. In the form shown in Figs. 1 and 2 they may be either spring or hinged, as above observed.

In operation, the jaws, being lifted to a point above the receding portions $f$ of the guides, will separate, so as to leave room for free travel of the wick between their teeth and the tube B. The wick being then adjusted over the tube B and slid downwardly until its lower end is between the jaws D, and the jaws, being then slid downwardly, will be forced toward the wick by means of the guides F below the receding portions $f$, and the teeth will be held in contact with the wick and cause it to move up and down together with the movement of the jaws. To remove the wick, it is simply necessary to raise the jaws to a point above the receding portions $f$, when they will automatically release it and it may be slid off the tube.

The point at which the jaws are released from the wick being at the top of the lamp, the adjustment of the wick to and its removal from the jaws are in plain sight and convenient for manipulation.

What I claim as my invention is—

1. The combination, with a wick-support and guides located upon opposite sides of the wick-support and spaced therefrom, said guides being provided with receding portions near their ends, of an operating-rod located at the side of the wick-support between the said guides, and a pair of spring grasping-jaws connected with the operating-rod, having a tendency to spring out of engagement with the wick and adapted to automatically follow the guides as they are moved up and down, substantially as set forth.

2. The combination, with a wick-support and guides located upon substantially diametrically-opposite sides of the wick-support and spaced therefrom, said guides being provided with receding portions near their upper ends, of an operating-rod located at the side of the wick-support between the guides, and a pair of grasping-jaws secured to the operating-rod and each having a sliding connection for securing it to one of the guides, whereby the jaws are caused to follow the guides as they are moved up and down to release and grasp the wick, substantially as set forth.

BARTLETT P. LUCE.

Witnesses:
FREDK. HAYNES,
GEORGE BARRY.